Feb. 10, 1942.  G. W. SCHATZMAN  2,272,680
FENDER SHIELD CONSTRUCTION AND ASSEMBLY
Filed March 11, 1940  3 Sheets-Sheet 1
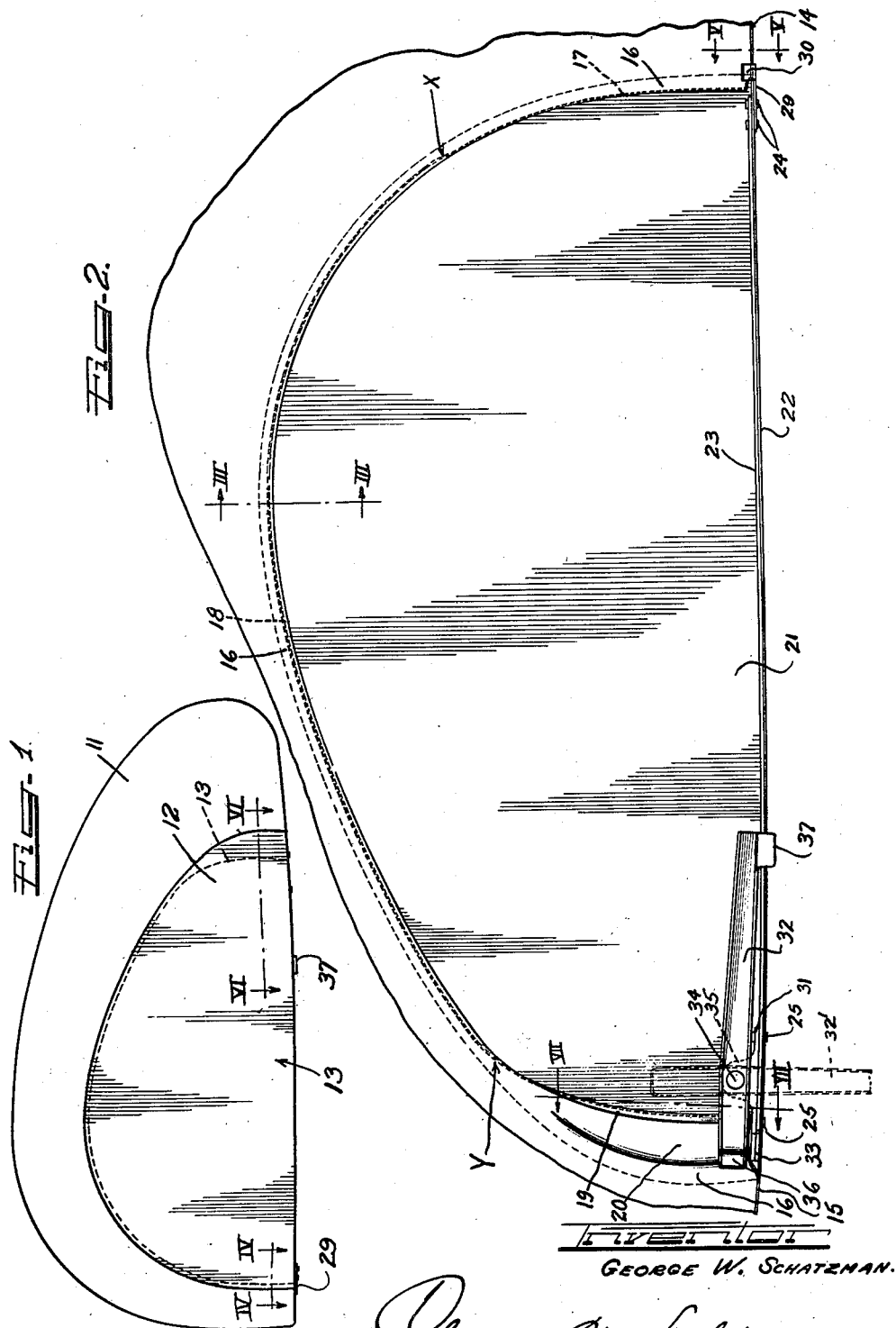
George W. Schatzman.

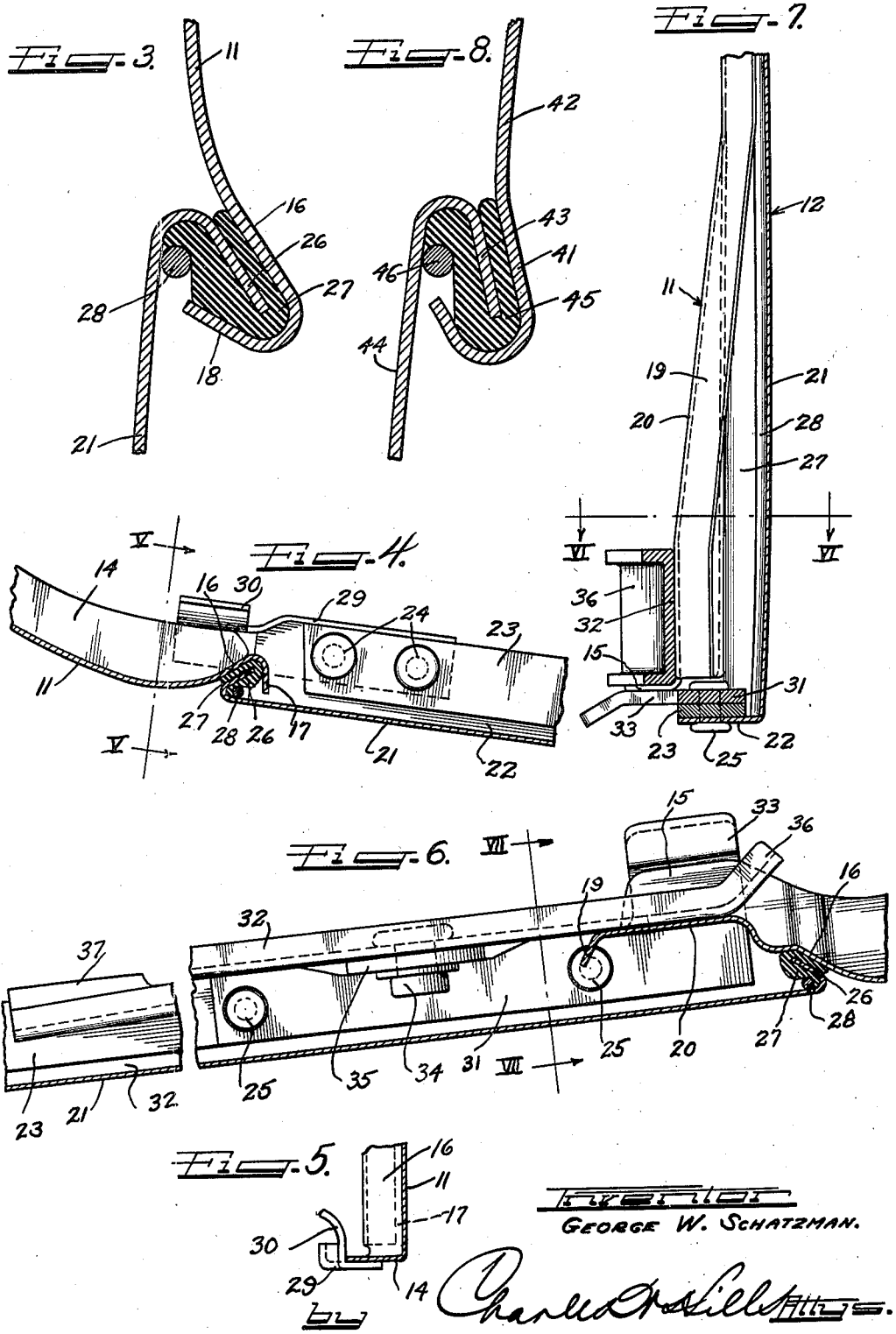

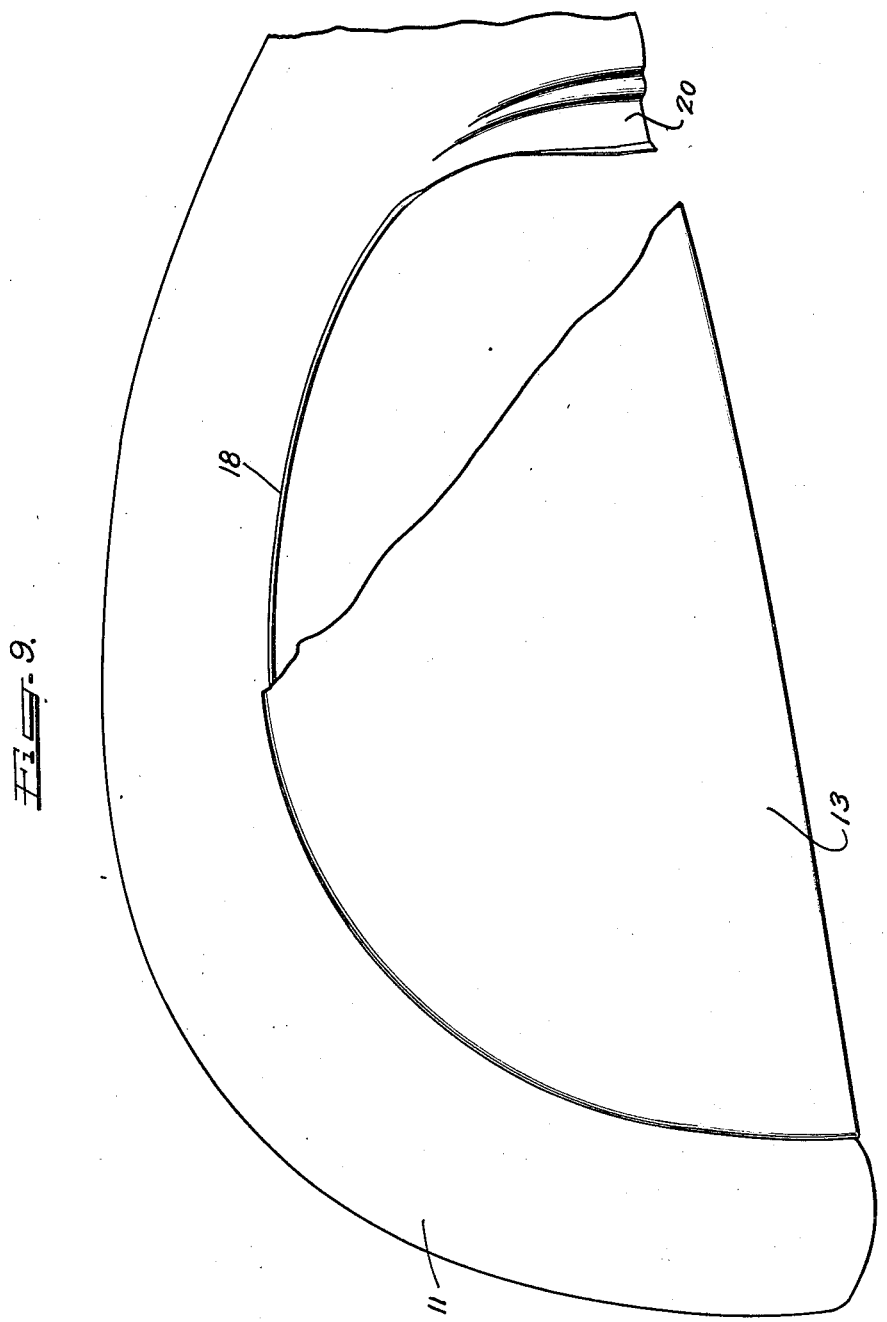

Patented Feb. 10, 1942

2,272,680

UNITED STATES PATENT OFFICE 2,272,680

FENDER SHIELD CONSTRUCTION AND ASSEMBLY

George W. Schatzman, Detroit, Mich., assignor to Houdaille-Hershey Corporation, Detroit, Mich., a corporation of Michigan Application March 11, 1940, Serial No. 323,244

8 Claims. (Cl. 280—153)

This invention relates to a fender shield and fender shield assembly, and more particularly, to a fender shield of novel design which cooperates with and is secured to a vehicle fender or other vehicle body part in a novel manner.

In the vehicle industry, and in particular in the automobile industry, various means have been utilized to improve the appearance of vehicle fenders. The usual vehicle fender is provided with an opening which affords access to the vehicle wheel, and which permits the ready removal of the wheel in an axial direction. Fender shields have been employed to improve the appearance of the vehicle body by substantially covering the wheel access opening in the vehicle with the fender.

As th term "fender shield" shall hereinafter be employed, it refers to any member which is adapted to be secured to a fender or other portion of the vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether said fender be separate from the vehicle body, partially separate from the vehicle body, or actually an integral part of the vehicle body, and whether or not it projects outwardly away from the principal body portion of the vehicle.

It is an object of the present invention to provide a novel fender shield construction.

Another object of the present invention is to provide a novel combination fender and fender shield assembly.

A further object of the present invention is to provide a novel fender shield construction and assembly wherein the fender shield is secured to a fender in a novel manner.

A still further object of the present invention is to provide a novel fender shield construction in which the fender shield and fender have interlocking peripheral edges and in which the fender shield is warped into desired tight engagement with the fender.

Another and further object of the present invention is to provide novel latching means for securing a fender shield to a vehicle fender.

Another and still further object of the present invention is to provide a novel fender construction which is arranged to receive and accommodate a fender shield.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings in which:

Figure 1 is a front elevational view of a vehicle fender and fender shield assembly;

Figure 2 is a rear elevational view of the fender and fender shield assembly shown in Figure 1;

Figure 3 is a greatly enlarged sectional view taken along the line III—III of Figure 2 showing the interlocking relationship of the top of the fender shield with the fender;

Figure 4 is a sectional view taken along the line IV—IV of Figure 1 and looking down on the hook arm on the leading edge of the fender shield;

Figure 5 is a sectional view taken along the line V—V of Figures 2 and 4, giving another view of the hook arm of Figure 4;

Figure 6 is a sectional view taken along the line VI—VI of Figures 1 and 7 and looking down on top of the latching mechanism located in proximity to the trailing edge of the fender shield;

Figure 7 is an enlarged sectional view taken along the line VII—VII of Figures 2 and 6 and showing a further view of the latching mechanism located at the trailing edge of the fender shield;

Figure 8 is an enlarged fragmentary sectional view similar to Figure 3 but showing a modified form of the present invention, and Figure 9 is an isometric view of the fender and fender shield with a portion of the shield broken away.

The embodiment of the present invention which is illustrated in Figures 1 to 8 of the drawings comprises a specially designed streamlined automobile fender 11 and a streamlined fender shield 12 covering a wheel access opening 13 in the side of the fender, the opening 13 being of the same general shape and slightly smaller than the fender shield 12. The lower edge of the fender, in front of and behind the wheel access opening 13, is formed with flanges 14 and 15 extending horizontally inward from the approximately vertical side wall of the fender, as shown in Figures 2, 4, 5, 6, 7 and 8. Around the edge of the wheel access opening, the side of the fender curves back and forms a recessed seat 16 for the edge of the fender shield 12, the seat 16 extending continuously from the bottom flange 14 in front of the wheel access opening around to the bottom flange 15 in back of the wheel access opening and having the form shown in cross section in Figures 3, 4, and 6. The extreme edge of the fender is bent out to form a flange 17—18—19, which extends around the entire wheel access opening but whose shape is different at different places. The front lower portion 17 of the flange, extending about half way up the front of the wheel access opening from the front base flange 14 to the point marked "X" in Figure 2, projects straight out and is approximately perpendicular to the plane of the fender shield, as shown in Figure 4. The upper portion 18 of the flange, extending up and back from the point X in Figure 2 to a point Y at the rear of the wheel access opening and about half way up from the bottom of the opening, projects obliquely up and out, as shown in Figure 3, and forms an upwardly facing trough or groove with the adjacent portion of the fender. At the rear of the wheel access opening, below the point marked "Y", the flange 19 projects obliquely out and towards the center of the wheel access opening, as shown in Figure 6. It will be noted from Figures 2 and 6 that, as the flange 19 extends down from the point "Y", it diverges from the sloping portion 16 upon which the edge of the fender shield 12 is seated, so that there is an intermediate portion 20 of the fender extending down to the rear base flange 15 of the fender.

The portion of the fender 20 (see Figures 2, 7 and 8) between the marginal flange 19 and the fender shield seat 16 at the rear of the wheel access opening slopes gradually back from the plane of the side of the fender and the fender shield as it extends down to the rear base flange 15, as shown in Figure 7, and forms a cam surface whose function is described later in this specification. It may be noted from Figure 6 that the rear base flange 15 extends past the fender shield seat 16 and along the bottom of the cam portion 20 and that the cam portion 20 of the fender is thus firmly supported with respect to the rest of the fender.

The fender shield 12 comprises a sheet metal panel 21 having its lower edge bent straight back to form a horizontal flange 22, which is reinforced by a flat bar 23 secured on top of it by rivets 24—25. The remainder of the edge of the fender shield, at the front and back and around the top, is bent back and in to form a flange 26 lying in back of the body of the panel 21. The flange 26 carries a rubber edging 27 which covers it both on the inside and outside, and which is held in place by a spring wire 28. The spring wire 28 is arranged in substantially the same way as the similar member disclosed and claimed in my copending application entitled "Fender shield," filed April 24, 1939, Serial No. 269,651. It will be noted that the angles of the portion 16 of the fender upon which the fender shield seats and of the fender shield flange 26 are constant from the lower front of the fender shield around to the lower rear thereof, thus permitting the rubber edging 27 to have the same cross section throughout its length and to be formed economically by an extrusion process.

The inner part of the rubber edging 27 is formed, as shown in Figure 3, to seat upon the marginal flange 18 at the top of the wheel access opening. Since the flange 18 slopes up and out, it serves both to support the fender shield and to hold its upper edge in against the side of the fender.

The lower front corner of the fender shield is held against lifting up and is held in against the side of the fender by a hook 29 secured to the front lower corner of the fender shield panel by the rivets 24 which fasten the reinforcing bar 23 to the flange 22 along the bottom of the panel. The hook 29 extends forward under the base flange 14 in front of the wheel access opening and is provided with a lip 30 which rises up in back of and in contact with the rear edge of the flange 14. The main part of the hook 29 under the base flange 14 holds the front of the fender shield down, and the lip 30 extending up in back of the base flange 14 holds the front lower part of the fender shield in tight contact with the fender.

The rear lower corner of the fender shield is held in place by a bracket 31 and a latch 32 carried by the bracket. The base of the bracket 31 is secured on top of the base bar 23 by the same rivets 25 which secure the base bar to the bottom flange 22 of the fender shield panel, and its rear end is formed with a lip or projection 33 which extends back under the flange 15 at the bottom of the cam portion 20 of the fender. The lip 33 thus prevents any upward movement of the rear portion of the fender shield.

The latch 32 is a generally straight lever, formed of pressed steel in the shape of a channel, and is mounted on a pivot 34 carried by a vertical portion 35 of the bracket 31. One end of the lever 32 extends behind the cam portion 20 of the fender and lies on top of the base flange 15 of the fender when the fender shield is in mounted position, and its extreme end 36 is bent obliquely back to form a cam surface adapted to engage the rear surface of the oblique flange 19 on the fender when the latch 32 is being swung to its latching position. The other or handle end of the lever 32 extends along above the reinforcing bar 23 and is formed with a lip 37 at its extreme end, the lip 37 extending down behind the edge of the base bar 23 and the base flange 22 of the fender shield. The lever 32 and the bracket 31—35 upon which it is pivoted are springy enough to allow the handle end of the lever to be sprung back to a position from which the lever can swing down behind the base bar 23 and base flange 22 to an upright position, as indicated by the dotted lines 32' in Figure 2. The lip 37 on the lever 32 depending behind the base bar 23 and base flange 22 can be engaged from the front and materially facilitates the springing back and subsequent operation of the lever 32.

The fender shield panel 21 may be shaped so that it conforms exactly to the shape of the fender, but I have found that a tighter fit less likely to develop rattles can be secured by so shaping the fender shield panel that it has to be sprung into place. This is best accomplished by shaping the panel 21 so that its rear lower corner carrying the latch 32 curves out away from the side of the fender, the curvature starting from near the point Y in Figure 2, where the flange on the fender changes from an obliquely upwardly extending flange 18 to an obliquely inwardly extending flange 19. The front end of the fender shield panel 21 may also be made so that a slight amount of springing is involved in mounting the fender shield. This is done by shaping the panel so that, if the front lower corner were not held in by the hook 29—30, it would curve out slightly from the side of the fender, the curving out starting from the point marked "X" in Figure 2 where the flange on the fender changes from an obliquely upwardly projecting flange 18 to a straight flange 17. The amount of divergence at the front should, in any case, be less than in the rear in order that the mounting of the fender shield on the fender will not be rendered difficult, and it may, of course, be omitted entirely.

The fender shield is mounted upon the fender by first placing the latch 32 in the vertical position indicated by the dotted lines 32' in Figure 2 and by engaging the lip 30 on the front hook 29 behind the front base flange 14 on the fender. The rear end of the fender shield is then held a few inches above its mounted position and is then gradually lowered as the upper edge of the fender shield is pressed into place with the flange 26 and the rubber edging 27 fitting down into the groove formed by the flange 18 around the top of the wheel access opening. The lower rear corner of the fender shield is then pressed in against the side of the fender, with the lip 33 on the rear bracket 31 passing under the rear base flange 15, and the latch 32 is then swung up to the horizontal position shown in Figure 2 and allowed to snap in above the base bar 23. It will be noted that the oblique end 36 of the latch 32 will engage the oblique flange 19 on the cam portion 20 of the fender and will then ride down on the inclined rear surface of the cam portion 20 itself, thus providing a continuous camming action which pulls the rear end of the fender shield in tightly against the side of the fender. This completes the mounting of the fender shield upon the fender and provides a tight non-rattling engagement between them.

As may be seen from Figure 3, the fact that the portion 16 of the fender against which the fender shield seats curves back from the main portion of the fender results in the side of the fender shield panel 21 and the side of the fender 11 being in line with each other, the fender shield, as it were, being set into the side of the fender, so that their surfaces are level. Also, as may be seen from Figure 2, the rear base flange 15 of the fender jogs up over the bracket 31, so that the bottom of the fender shield is in line with the bottom of the fender in back of the fender shield. Thus, both the fender and fender shield form a single streamlined shape which is extremely pleasing to the eye.

If it is not desired to have the surface of the fender shield form a continuation of the surface of the fender, the edges of the fender and fender shield can be formed as shown in Figure 8 instead of as shown in Figure 3. In this form of the invention, the fender shield seating portion 41 of the fender 42 is substantially in line with the side of the fender instead of extending obliquely backward, and the flange 43 on the edge of the fender shield panel 44 is at only a slight angle to the body of the panel 44. The rubber edging 45, held in place by the retaining wire 46, differs slightly from the edging in the preferred form of the invention in order to fit the slightly different fender and fender shield.

While I have shown only one form of my invention and one slight modification thereof, it will, of course, be understood that these have been shown by way of example and that the scope of the patent is not to be limited thereto, since many modifications may be made without departing from the spirit of the invention.

I claim as my invention:

1. A streamlined wheel housing structure open at the bottom and having a substantially smooth side wall, said side wall comprising a removable part and a fixed part extending above and ahead of and behind said removable part, the marginal portion of said fixed part around the upper portion of said opening projecting inwardly and then outwardly forming a channel, the outer edge of which is in substantially the same vertical plane as the side wall of said housing structure, said removable part having a flange interengaging with said channel for supporting said removable part on said fixed part.

2. A fender and fender shield combination combination comprising a fender having a substantially upright side with a wheel access opening therein, the edge portion of said side around said opening being obliquely set back and having a forwardly and upwardly projecting flange along the upper portion of said opening, the forward edge of said flange lying in substantially the same vertical plane as the upright side of said fender, and a fender shield having a portion fitting down behind said fender flange and against said set back portion, the face of said fender shield being in line with the main portion of the surface of said fender side and forming substantially a continuous surface therewith.

3. In a fender and fender shield combination, a fender having a side wall with a wheel access opening, a fender shield panel covering said opening and overlapping said wall around said opening, means engageable by a downward movement of the fender shield panel relative to said fender for supporting said fender shield panel on said fender wall and holding the upper portion thereof against said fender wall, a member fixed to said panel and adapted to fit under the lower edge of said fender wall at one side of said opening, and a cam mechanism for forcing said panel against said fender wall at said side of said opening.

4. In a fender and fender shield combination, a fender having a side wall with a wheel access opening, a fender shield panel covering said opening and overlapping said wall around said opening, means for supporting said fender shield panel on said fender wall and holding the upper portion thereof against said fender wall, a member fixed to said panel and adapted to fit under the lower edge of said fender wall at one side of said opening, and a cam mechanism for forcing said panel laterally against said fender wall at said side of said opening, said mechanism including a cam surface on the back of said fender wall sloping laterally away from said fender wall, and a member carried by and movable relative to said fender shield panel and engageable with said cam surface.

5. In a fender and fender shield combination, a fender having a side wall with a wheel access opening, a fender shield panel covering said opening and overlapping said wall around said opening, means for supporting said fender shield panel on said fender wall and holding the upper portion thereof against said fender wall, the shape of said panel being such that the lower part of said panel curves out away from said fender wall at one side of said opening when said panel is unstrained and is so supported and held, a member fixed to said panel and adapted to fit under the lower edge of said fender wall at said side of said opening, and a cam mechanism for forcing said panel against said fender wall at said side of said opening and holding of said panel in a strained condition thereon.

6. A fender and fender shield combination comprising a fender having a substantially upright side wall with a wheel access opening therein, said fender having a projection extending back from the lower edge of said side wall at one side of said opening, and a fender shield comprising a panel covering said opening and overlapping said fender side wall at said side of said opening, a bracket fixed to the bottom of said panel and including a lip projecting back from said panel at the end thereof overlapping said fender side wall, and a lever pivoted on said bracket and having one end overlying said lip, said projection on said fender being clamped between said lip and said lever.

7. A fender having a side wall with a wheel access opening, said fender being formed with a cam surface sloping downwardly and inwardly away from said side wall on the inside thereof at one side of said opening.

8. A fender and fender shield combination comprising a fender having a substantially upright side with a wheel access opening therein, the edge portion of said side around said opening being set back and having a forwardly and upwardly projecting flange at the top of said opening and a forwardly projecting flange at the sides of said opening, and a fender shield comprising a panel with an obliquely inwardly projecting flange around the top and side edges thereof, said flange fitting against said set back portion of said fender side around said opening and fitting down behind said fender flange above said opening, the face of said fender shield being in line with the main portion of the surface of said fender side, said fender shield also having releasable means engaging said fender near the bottom thereof at either side of said opening for preventing movement of said fender shield upwardly relative to said fender and for preventing outward movement of the lower portion of said fender shield relative to said fender.

GEORGE W. SCHATZMAN.